(12) United States Patent
Green

(10) Patent No.: US 12,732,491 B2
(45) **Date of Patent: *Sep. 8, 2026**

(54) VEHICLE SECURITY SYSTEM

(71) Applicant: Karma Automotive LLC, Irvine, CA (US)

(72) Inventor: Brian Green, Laguna Hills, CA (US)

(73) Assignee: Karma Automotive, Inc., Irvine, CA (US)

( * ) Notice: Subject to any disclaimer, the term of this patent is extended or adjusted under 35 U.S.C. 154(b) by 440 days.

This patent is subject to a terminal disclaimer.

(21) Appl. No.: 18/151,867

(22) Filed: Jan. 9, 2023

(65) Prior Publication Data

US 2023/0164128 A1 May 25, 2023

Related U.S. Application Data

(63) Continuation of application No. 16/787,736, filed on Feb. 11, 2020, now Pat. No. 11,563,726.

(51) Int. Cl.

*H04L 9/40* (2022.01)
*G06F 13/42* (2006.01)

(Continued)

(52) U.S. Cl.

CPC .............. *H04L 63/08* (2013.01); *G06F 13/42* (2013.01); *H04L 12/40013* (2013.01);

(Continued)

(58) Field of Classification Search

CPC ... H04L 63/08; H04L 63/0442; H04L 63/062; H04L 63/18; H04L 12/40013; H04L 12/66; H04L 2463/082; H04L 67/12; H04L 2209/84; H04L 2012/40215; H04L 9/0643; H04L 9/3236; H04L 12/40104; H04L 9/3242; H04L 2209/80; H04L 63/061;

(Continued)

(56) References Cited

U.S. PATENT DOCUMENTS 10,002,258 B2 6/2018 Litichever et al.
2014/0143839 A1 5/2014 Ricci (Continued)

FOREIGN PATENT DOCUMENTS

CN 101427544 A 5/2009
CN 106953796 A 7/2017

(Continued)

OTHER PUBLICATIONS

European Patent Office, Extended EP Search Report for Application 21754624.1 dated May 6, 2024.

(Continued)

*Primary Examiner* — Hitesh Patel

(74) *Attorney, Agent, or Firm* — Honigman LLP; Thomas J. Appledorn; Grant Griffith

(57) ABSTRACT

A security system for a vehicle network of a vehicle is provided. The vehicle network includes a gateway and domain controllers for specific areas of the vehicle. The security system may validate messages sent from the gateway. The security system may also utilize split decryption keys in order to decrypt messages in the vehicle network. The security system may also utilize asymmetrical encryption keys in order to secure data within the vehicle network.

14 Claims, 4 Drawing Sheets

(51) Int. Cl.
*H04L 12/40* (2006.01)
*H04L 12/66* (2006.01)
*H04L 67/12* (2022.01)

(52) U.S. Cl.
CPC .......... *H04L 12/66* (2013.01); *H04L 63/0442* (2013.01); *H04L 63/062* (2013.01); *H04L 63/18* (2013.01); *H04L 67/12* (2013.01); *H04L 2463/082* (2013.01)

(58) Field of Classification Search
CPC ....... H04L 9/0819; H04L 9/14; H04L 9/0816; H04L 9/0825; G06F 13/42; H04W 4/48; H04W 12/0431; H04W 12/06; H04W 12/069
USPC .......................................................... 713/168
See application file for complete search history.

(56) References Cited

U.S. PATENT DOCUMENTS

| | | | | |
|---|---|---|---|---|
| 2015/0033016 | A1* | 1/2015 | Thornton | H04L 9/0869 713/171 |
| 2017/0070488 | A1 | 3/2017 | Jun | |
| 2018/0084412 | A1 | 3/2018 | Alfred et al. | |
| 2019/0009716 | A1 | 1/2019 | Scalea et al. | |
| 2019/0092283 | A1 | 3/2019 | Kristinsson et al. | |
| 2019/0239221 | A1 | 8/2019 | Ujiie et al. | |
| 2019/0379682 | A1 | 12/2019 | Overby et al. | |
| 2019/0394089 | A1 | 12/2019 | Barrett et al. | |
| 2020/0169555 | A1 | 5/2020 | Chung et al. | |
| 2020/0273268 | A1* | 8/2020 | Bhattacharyya | G06Q 10/06315 |
| 2021/0209388 | A1 | 7/2021 | Ciftci et al. | |
| 2026/0067300 | A1* | 3/2026 | Kang | H04L 63/1416 |

FOREIGN PATENT DOCUMENTS

| | | |
|---|---|---|
| CN | 107846395 A | 3/2018 |
| CN | 109428716 A | 3/2019 |
| CN | 109845195 A | 6/2019 |

OTHER PUBLICATIONS

European Patent Office, Partial Supplementary EP Search Report for Application 21754624.1 dated Feb. 12, 2024.

USPTO. Office Action relating to U.S. Appl. No. 16/787,736, dated Jan. 24, 2022.

Lee et al., Sensors 2020, Received: Nov. 15, 2019; Accepted: Jan. 21, 2020; Published: Jan. 23, 2020, "Design of a FlexRay/Ethernet Gateway and Security Mechanism for In-Vehicle Networks" (Year: 2020).

CN Patent Office, First Office Action for Application 202180013735.6, dated Feb. 19, 2025.

Feng Luo et al., Security Mechanisms Design for In-Vehicle Network Gateway, In: SAE International by University of Nottingham, Apr. 3, 2018 [retrieved on Apr. 21, 2021]. Retrieved from <https://www.sae.org/publications/technical-papers/content/2018-01-0018/>.

Xiaodong Lin et al., Achieving Efficient Cooperative Message Authentication in Vehicular Ad Hoc Networks, In: IEEE Transactions on Vehicular Technology (vol. 62, Issue: 7, Sep. 2013), Sep. 2013 pp. 3341-3345.

International Search Report from corresponding application No. PCT/US2021/015928 mailed May 24, 2021, all enclosed pages cited.

Liu Yi, et al, "Security Protocol for On-Board Controller Area Networks," *Journal of Xi'an Jiaotong University*, (Mar. 27. 2018), vol. 52, No. 05.

* cited by examiner

VEHICLE SECURITY SYSTEM

CROSS REFERENCE TO PRIOR APPLICATIONS

This U.S. patent application is a continuation of, and claims priority under 35 U.S.C. § 120 from, U.S. patent application Ser. No. 16/787,736, filed on Feb. 11, 2020. The disclosure of this prior application is considered part of the disclosure of this application and is hereby incorporated by reference in its entirety.

TECHNICAL FIELD

The present disclosure relates to a security system for a vehicle. Specifically a system and method for a vehicle that employs a multi-factor authentication method.

BACKGROUND

A vehicle, such as an automobile, may include systems that are connected to external networks such as the internet or other wireless systems such as a local area network. As more vehicles incorporate features that incorporate these networks, the more vulnerable the vehicles are to security exploitations. It is vital to ensure that modules within the vehicle's network are trusted and communication between the vehicle systems and modules are secure.

Conventionally, vehicle network systems are connected using un-secured connections. Messages received or sent by the vehicle network system may be tampered or modified in a malicious manner. It is an object of the present invention to provide a security system for the vehicle network system of a vehicle in order to protect the vehicle from malicious attacks. The disclosed embodiments provide security to ensure systems and modules of the vehicle network are valid and increases the difficulty associated with hacking vital systems or modules of the vehicle.

SUMMARY

An aspect of the disclosure provides a computer-implemented method when executed on a processor of a domain controller of a vehicle network for a vehicle causes the processor to perform operations that include receiving, from a gateway of the vehicle network that is in communication with the domain controller, a first message and a second message. The operations also include determining that the first message and the second message are received within a designated period, and based on determining that the first message and the second message are received within the designated period, processing the first message and the second message to control elements of a vehicle network.

Implementations of the disclosure may include one or more of the following optional features. In some implementations, the operations also include determining that the first message and the second message match, wherein processing the first message and the second message to control elements of the vehicle network is further based on determining that the first message and the second message match. In some examples, the first message is received from the gateway by one of an Ethernet connection or a CAN bus. In these examples, the second message may be received from the gateway via the other one of the Ethernet connection or the CAN bus. In some implementations, the gateway of the vehicle network is in communication with the domain controller through an Ethernet connection and a CAN bus. In these implementations, the CAN bus may directly connect at least one electronic control unit to the domain controller and the gateway. Moreover, the CAN bus may include a CAN-FD.

In some Implementations, the operations also include transmitting, from the domain controller, via a CAN bus, a third message to another domain controller of the vehicle network. Here, the domain controller and the another domain controller are each configured to control a different respective system of the vehicle. In these implementations, the third message when received by the another domain controller causes the another domain controller to control one or more functions of the respective system of the vehicle controlled by the another domain controller. Moreover, the respective system of the vehicle controlled by the domain controller may include one of a powertrain system, an Advance Driver Assistance System (ADAS), a chassis system, or a safety system, and the respective system of the vehicle controlled by the another domain controller may include a different one of the powertrain system, the ADAS, the chassis system, or the safety system.

Another aspect of the disclosure provides a computer-implemented method when executed on a processor of a domain controller of a vehicle network causes the processor to perform operations that include receiving a first message from a gateway of the vehicle network and receiving a second message from the gateway. The first message includes a first portion of an authentication key and the second message includes a second portion of the authentication key. The operations also include determining that the first message includes the first portion of the authentication key and that the second message includes the second portion of the authentication key, and based on the first message including the first portion of the authentication key and the second message including the second portion of the authentication key, decrypting the first message and the second message.

These aspects of the disclosure may include one or more of the following optional features. In some examples, the first portion of the authentication key and the second portion of the authentication key are combinable into a complete authentication key. In some configurations, receiving the first message from the gateway of the vehicle network includes receiving the first message from the gateway via a CAN bus. Here, the CAN bus may directly connect at least one electronic control unit to the domain controller and the gateway. The CAN bus may include a CAN-FD. In some implementations, receiving the second message from the gateway includes receiving the second message from the gateway via an Ethernet connection.

In some examples, the computer-implemented method also includes transmitting, from the domain controller, via a CAN bus, a third message to another domain controller of the vehicle network, wherein the domain controller and the another domain controller are each configured to control a different respective system of the vehicle. In these examples, the third message when received by the another domain controller causes the another domain controller to control one or more functions of the respective system of the vehicle controlled by the another domain controller. Additionally or alternatively, in these examples, the respective system of the vehicle controlled by the domain controller may include one of a powertrain system, an Advance Driver Assistance System (ADAS), a chassis system, or a safety system and the respective system of the vehicle controlled by the another domain controller may include a different one of the powertrain system, the ADAS, the chassis system, or the safety system.

The details of one or more implementations of the disclosure are set forth in the accompanying drawings and the description below. Other aspects, features, and advantages will be apparent from the description and drawings, and from the claims.

DESCRIPTION OF DRAWINGS

The features, aspects, and advantages of the present disclosure will become apparent from the following description, and the accompanying exemplary embodiments shown in the drawings, which are briefly described below.

DETAILED DESCRIPTION

According to one embodiment of the disclosure, a vehicle includes various systems that include an electronic control unit (ECU). An ECU herein denotes any electronic system or unit within a vehicle with processing capabilities. One of more ECUs may be used to control different vehicle systems of the vehicle such as the vehicle propulsion (e.g., throttle or motor), steering, brakes, HVAC, sensors, radio, doors, engine, airbags, motors, infotainment and many other electronic systems contained in the vehicle. A vehicle network architecture may be divided into domains with a central gateway that bridges and provides connections between domains. A vehicle may include a network system that is used within each domain. The network system may include a domain controller. The domain controller may include a processor and function as an ECU or the domain may include one or more ECUs for carrying out and controlling the required functions of the vehicle systems contained in the domain. Each ECU may be integrated in the domain controller or may be a separate component of the domain.

A central gateway may be connected to a domain controller by Ethernet and/or CAN bus type connections. A message may be transmitted on both Ethernet and CAN bus connections simultaneously. However, the message receiving module would only consider the message to be valid when the messages on both the Ethernet and CAN bus match within a designated period. In order for the security of the network architecture to be compromised, an intruder must break the security on both network connections (Ethernet and CAN bus) and must have the necessary hardware to support both network connections. Thus, the multi-factor authentication (e.g., matching messages on both the Ethernet and CAN bus communications links) provides for improved security for the modules in a vehicle.

According to another embodiment, each of a plurality of network connections (e.g., Ethernet, CAN bus, etc.) may send a portion of an authentication token to the receiving module. The receiving module is configured to require all portions of the authentication token to be received from more than one network connections before validating data or acting on instructions being sent to the receiving module.

In another embodiment, the gateway may send asymmetrical encryption keys to each domain. A CAN-FD connection may be placed between each domain. Data sent between domains on the CAN-FD connection may be used by each domain only when the asymmetrical keys delivered by the gateway is used. Thus, the validation of the data being carried by the CAN-FD bus is provided by the asymmetrical encryption key provided by a separate source (e.g., the central gateway).

Figure 1:
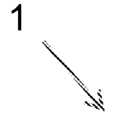
FIG. 1 is a schematic view of an exemplary vehicle network system.
Figure 1:
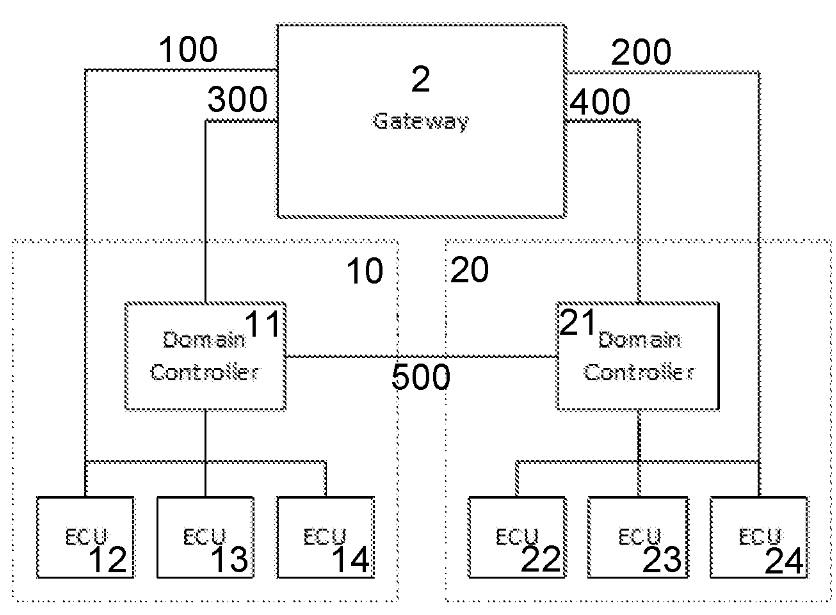

FIG. 1 is a simplified diagram or schematic of a vehicle network system 1. The vehicle network system includes a gateway 2 and two domains 10 and 20. Each domain 10/20 includes a domain controller 11/21 and multiple ECUs 12, 13, 14/22, 23, 24. Any number of domains and domain controllers may be disposed in the vehicle network system, only two are shown for this exemplary embodiment. Similarly, only three ECUs are shown, but any number of ECUs may be disposed in the vehicle network 1. A CAN bus 100/200 may be used to connect the gateway 2, corresponding ECUs (12, 13, 14/22, 23, 24) and corresponding domain controllers 11/21 of each domain. The CAN bus may be a CAN-FD (CAN with Flexible Data-Rate), thus allowing higher bandwidth data to be carried by the bus. The gateway 2 acts as a communication bridge between the two buses and domains. The gateway 2 allows message(s) to pass between domains to domain controllers or individual ECUs. The message(s) may be utilized by the module (ECU or domain controller) receiving the message(s). The vehicle network system 1 may also include Ethernet connections 300/400 connecting the gateway 2 to the domain controllers 11/21. An additional CAN bus 500 may be connected between the first domain 10 and the second domain 20 via the respective domain controllers 11, 21.

Each domain may correspond to a group of systems in the vehicle. For example, a first domain 10 may be a powertrain domain for a conventional, electric or hybrid vehicle. The powertrain domain may include all the electronics of the power train (e.g. motor controllers, inverters, hybrid combustion systems, associated ECUs, etc.), and the second domain 20 may be an Advance Driver Assistance Systems (ADAS) domain which includes all electronics of the ADAS (e.g. automotive sensors, ECUs, etc.). Although only two domains are shown, other domains such as the chassis domain and the safety domain may also be connected and communicate with each other using the connection methodology discussed herein. As an example, the ADAS domain 20 may send a message to the power train domain 10 to lower the voltage of the propulsion motors to lower the velocity and/or acceleration of the vehicle due to a vehicle sensor in the ADAS domain sensing that the vehicle is approaching an object or a stop sign. Another application may be utilized in FOTA (Firmware over the air) update of firmware on a safety critical device of the vehicle. For example, Gateway 2 may have a firmware update for safety critical domain controller 11. The firmware update is transmitted in blocks of data over Ethernet 300. For each block of data, a validating code is transmitted over CAN 100 within a window of time. The update is only valid if each data block receives a corresponding validity code. This will add a level of security that will prevent unwanted code from being installed and executed on safety critical devices.

Each domain controller 11/21, each ECU 12, 13, 14 and 22, 22, 23, and the gateway 2 may contain a processor and a memory. The memory is in communication with the corresponding processor, such as in any known wired, wireless, or waveguide manner. The memory comprises a computer-readable storage medium, which can be non-transitory. The storage medium stores a plurality of computer-readable instructions for execution via the processor. The instructions include data that causes the processor to act to facilitate performance of a component of the domain. For example, the instructions may cause the process to act to enable the performance of a method for automated turn signal activation, automated braking, lane keeping, airbag deployment, etc. For example, the instructions may include data required to control an operating system of the vehicle or an application to run on the operating system of the vehicle. For example, the processor and the memory can enable various file or data input/output operations, whether synchronous or asynchronous, including any of the following: reading, writing, editing, modifying, deleting, updating, searching, selecting, merging, sorting, encrypting, de-duplicating, or others.

The memory can comprise at least one of a volatile memory unit, such as random access memory (RAM) unit, or a non-volatile memory unit, such as an electrically addressed memory unit or a mechanically addressed memory unit. For example, the electrically addressed memory comprises a flash memory unit. For example, the mechanically addressed memory unit comprises a hard disk drive. The memory can comprise a storage medium, such as at least one of a data repository, a data mart, or a data store. For example, the storage medium can comprise a database, including distributed, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Figure 2:
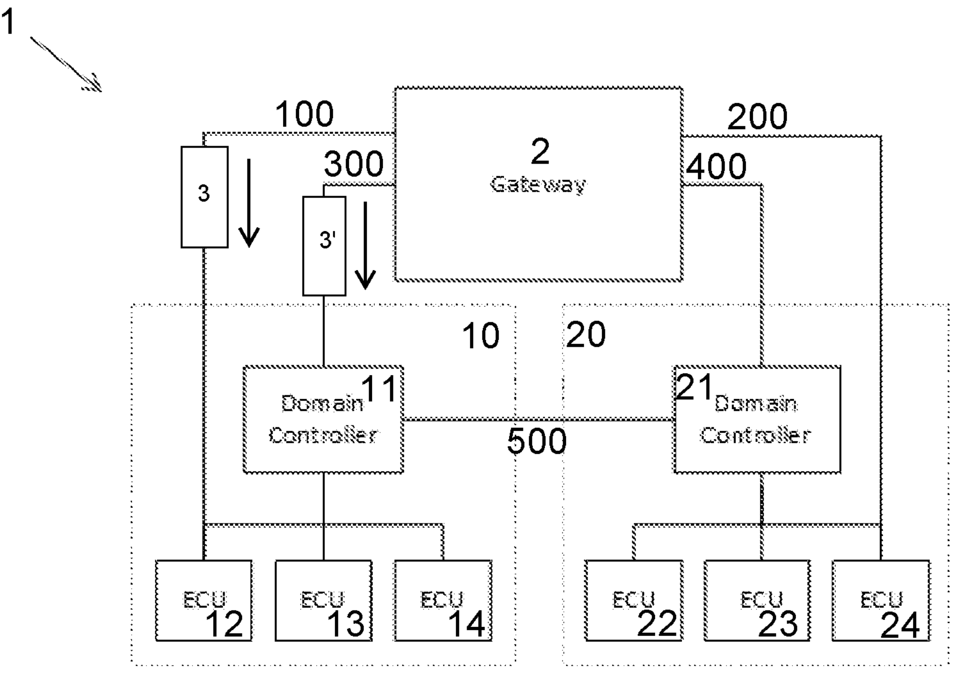
FIG. 2 is a schematic view of the exemplary vehicle network system of FIG. 1 with a security system according to a first embodiment.

FIG. 2 shows a first embodiment of a security system for the vehicle network system 1. The gateway 2 may transmit a pair of messages 3 and 3' that may be sent to the domain controller 11 and at least one ECU 12/13/14 via the CAN bus 100 or the Ethernet connection 300. The domain controller 11 or the at least one ECU 12/13/14 will only accept the messages 3 and 3' when the corresponding messages match (e.g., contain identical or the same data) within a designated period. The processor of each receiving module (domain controller and/or ECU) will determine if the received messages match. The domain controller 11 may receive both messages 3/3' in order to compare the messages. If the messages match, then the message 3 (or 3') will be considered valid by the domain controller 11 or ECUs 12/13/14 via each corresponding processors and may be stored into the memory of the domain controller or ECUs and/or processed and utilized by the processor of the domain controller or ECUs to control elements of the vehicle. The processor of the domain controller will mark the messages as valid and store the message in the memory of the domain controller and utilize the messages in controlling vehicle systems under ECUs 12/13/14. If the messages do not match, then the messages will not be accepted by any receiving module and the message will not be stored or utilized by the domain controller 11. The processor of the domain controller will mark the message as invalid. Marking the message as invalid may cause the message to be deleted. As shown in FIG. 2, the first domain 10 is receiving the messages 3/3', however, the exemplary security system may also apply to the second domain 20.

Figure 3:
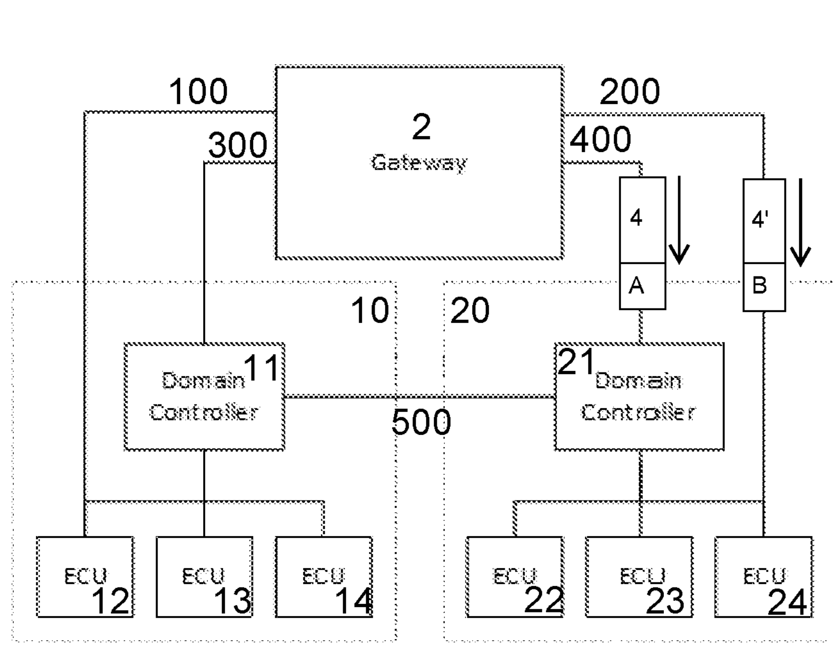
FIG. 3 is a schematic view of the exemplary vehicle network system of FIG. 1 with a security system according to a second embodiment.

FIG. 3 shows a second embodiment of a security system for the vehicle network system 1. The gateway 2 may transmit a first message 4 comprising a first portion of an authentication key 'A' and a second message 4' comprising a second portion of the authentication key 'B.' The first message 4 and the second message 4' may be sent to the domain controller 21 via the CAN bus 200 and the Ethernet 400 respectively. The first and second portions of the authentication key 'A'/'B' combined create a complete authentication key. The domain controller 21 may only consider any data or instructions contained in messages 4 and 4' when the domain controller receives a complete authentication key 'A' and 'B' attached to the corresponding messages.

For example, the first and second portions of the authentication key may be halves of a key to decrypt messages 4 or 4'. The complete key allows the domain controller 20 to decrypt incoming encrypted messages through the Can bus 200 or Ethernet 400 via the processor of the domain controller 20. While only two authentication key portions are shown ('A'/'B') the vehicle network system 1 may include multiple keys portions in any number of connections to the domain controller. As shown, the second domain 20 is receiving the messages 4 and 4'. However, the exemplary security system described may also apply to the first domain 10.

Figure 4:
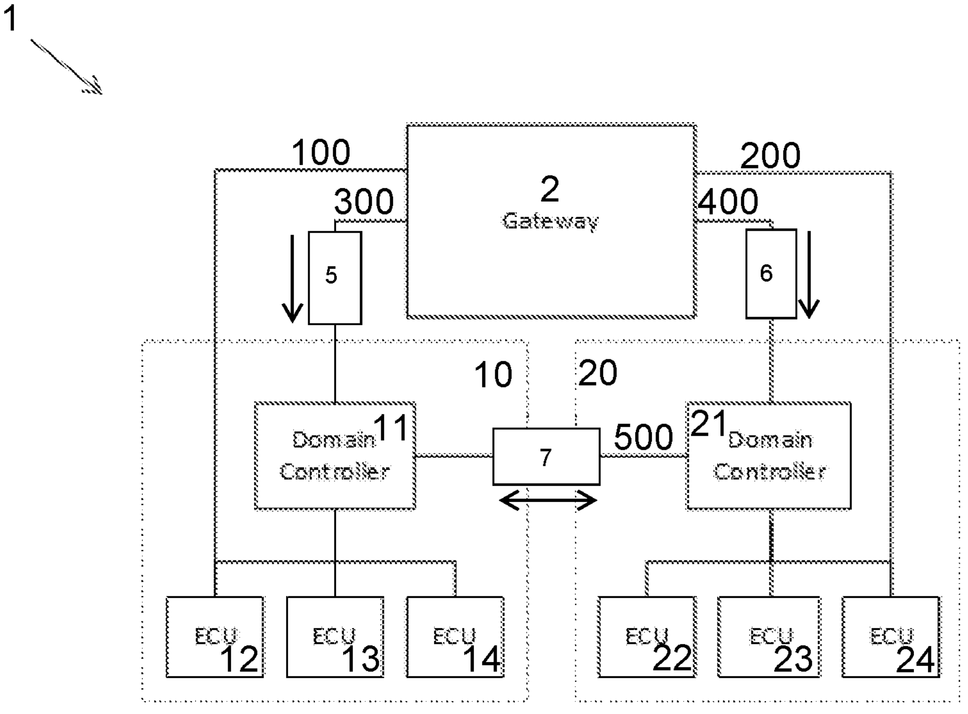
FIG. 4 is a schematic view of the exemplary vehicle network system of FIG. 1 with a security system according to a third embodiment.

FIG. 4 shows a third embodiment of a security system for the vehicle network system 1. The gateway 2 may transmit an asymmetrical cryptography key 5 to domain controller 11 via the Ethernet connection 300, and an asymmetrical cryptography key 6 to domain controller 21 via the Ethernet connection 400. Messages (e.g. data) 7 may be encrypted using the cryptography key 5 via the processor of the domain controller 11 and sent via on CAN bus 500, and decrypted using the cryptography key 6 via the processor of the domain controller 21. The reverse may also be possible, wherein messages (e.g. data) 7 may be encrypted using the cryptography key 6 via the processor of the domain controller 21, and decrypted using the cryptography key 5 via the processor of the domain controller 11. This encryption method requires two different keys for the messages on the CAN bus to be utilized.

Figure 5:
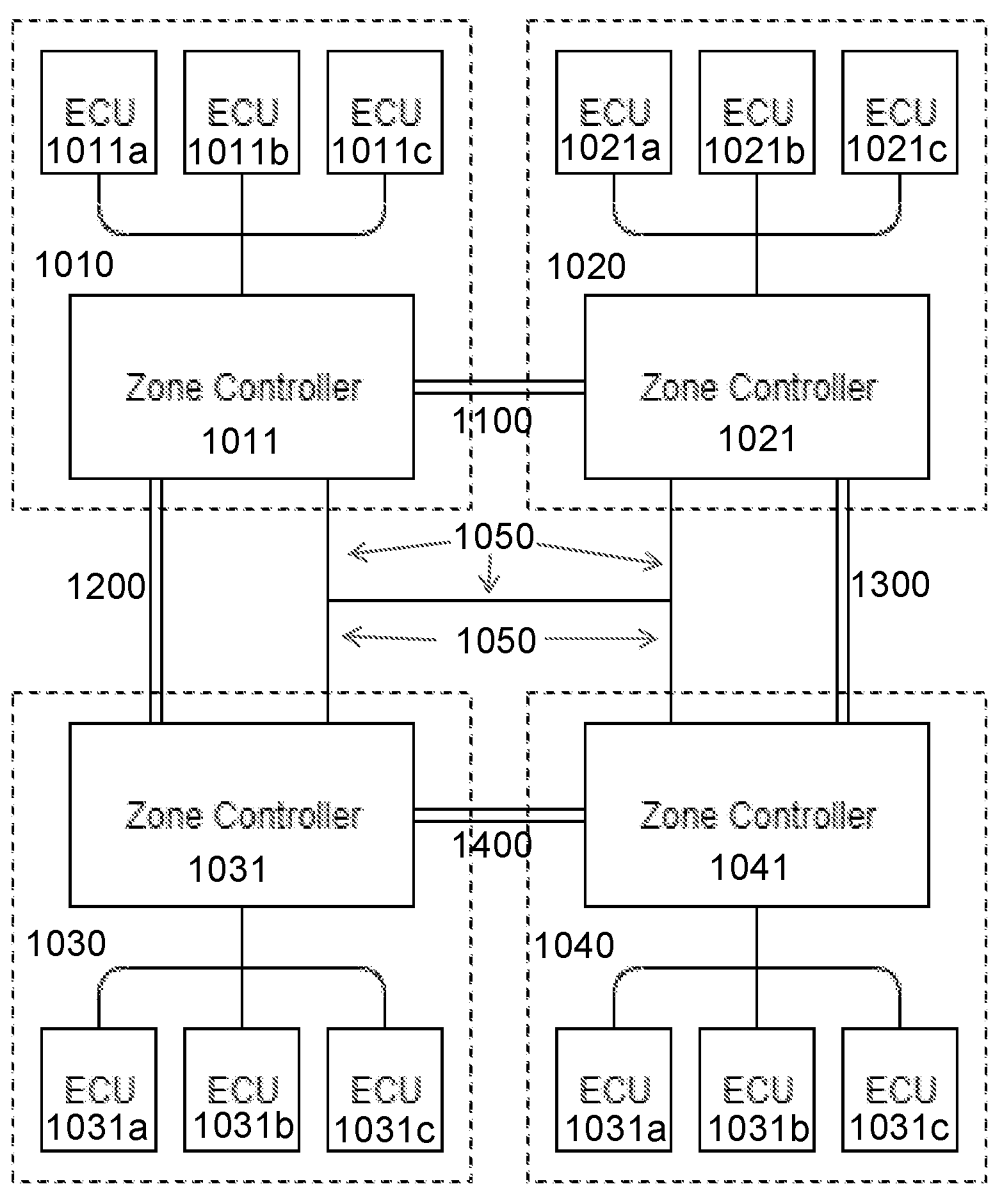
FIG. 5 is a schematic view of another exemplary vehicle network system with a security system according to an exemplary embodiment.

The security system as described above may be employed with any network connections with multiple domains, nodes, zones, or any other separate network areas. FIG. 5 shows a fourth embodiment of a security system for a vehicle network system 1000. The vehicle network system 1000 shows a zoned architecture system. Instead of a master gateway and servant domains as shown in the embodiments above, each vehicle zone are of equal standing in the network. As shown in FIG. 5, the vehicle network system 1000 may include 4 zones 1010, 1020, 1030, and 1040, each with a corresponding controller 1011, 1021, 1031, and 1041. Each controller includes corresponding ECUs 1011_a-c_, 1021_a-c_, 1031_a-c_, and 1041_a-c_ each configured to control a corresponding vehicle system. An Ethernet ring comprising Ethernet connections 1100, 1200, 1300, and 1400 is configured to link the four zones and controllers together. Additionally the four zones and controllers may be connected via a common CAN connection network 1050. A security system may be provided similar to the previous described embodiments.

A message may be transmitted via Ethernet connections 1100, 1200, 1300, and 1400 to any of the zone controllers 1011, 1021, 1031, and 1041. The zone controllers 1011, 1021, 1031, and/or 1041 will only accept the messages and when the corresponding messages match (e.g., contain identical or the same data) in both the CAN connection network and Ethernet connection within a designated period. A processor of the corresponding zone controller 1011, 1021, 1031, and 1041 receiving the message will determine if the received messages match. If the messages match, then the message will be considered valid by the receiving controller 1011, 1021, 1031, and/or 1041 via each corresponding processors of the receiving controller and may be stored into the memory of the receiving zone controller 1011, 1021, 1031, and 1041 and/or processed and utilized by the processor of the receiving zone controller. The corresponding processor of the zone controller 1011, 1021, 1031, and 1041 will mark the messages as valid and store the message in the memory of the zone controller and utilize the messages in controlling vehicle systems under ECUs 1011*a-c*, 1021*a-c*, 1031*a-c*, and 1041*a-c*. If the messages in the CAN network and Ethernet network do not match, then the messages will not be accepted by any receiving controller and the message will not be stored or utilized by any controller. The processor of corresponding zone controllers 1011, 1021, 1031, and 1041 will mark the message as invalid. Marking the message as invalid may delete the message.

FIG. 5 also illustrates that an ethernet message may take multiple hops through different zones and be validated by a single CAN. For example, when opposing corners of zone controllers (e.g. opposing corners 1031 to 1021 and 1041 to 1011 or vice versa) sends an ethernet message, it needs to be bridged and passed through an intermediate zone controller. Since the CAN is shared equally by all zones, the ethernet transmittal may be validated on this intermediate zone controller despite the ethernet message taking multiple network hops. For example, a message sent from zone controller 1011 to zone controller 1041 may be validated by zone controller 1021 and 1031.

An exemplary vehicle network system may utilize all described embodiments as discussed above. Each embodiment is not limited to the described security system and may utilize security systems described in other embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the connection of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the vehicle network security system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A computer-implemented method when executed on a processor of a domain controller of a vehicle network for a vehicle causes the processor to perform operations comprising: receiving, from a gateway of the vehicle network that is in communication with the domain controller, a first message and a second message, the first message received via one of a CAN bus or a first Ethernet connection and the second message received via the other one of the CAN bus or the first Ethernet connection; determining that the first message and the second message match by determining that the first message and the second message contain identical data; determining that the first message and the second message are received within a designated period; based on determining that the first message and the second message match and are received within the designated period, processing the first message and the second message to control elements of a vehicle network; and transmitting, from the domain controller, via an additional CAN bus, a third message to another domain controller of the vehicle network, wherein the domain controller and the another domain controller are each configured to control a different respective system of the vehicle.

2. The computer-implemented method 1, wherein the operations further comprise:

determining that the first message and the second message match, wherein processing the first message and the second message to control elements of the vehicle network is further based on determining that the first message and the second message match.

3. The computer-implemented method of claim 1, wherein the gateway of the vehicle network is in communication with the domain controller through the first Ethernet connection and the CAN bus.

4. The computer-implemented method of claim 3, wherein the CAN bus directly connects at least one electronic control unit to the domain controller and the gateway.

5. The computer-implemented method of claim 3, wherein the CAN bus comprises a CAN-FD.

6. The computer-implemented method of claim 1, wherein the third message when received by the another domain controller causes the another domain controller to control one or more functions of the respective system of the vehicle controlled by the another domain controller.

7. The computer-implemented method of claim 1, wherein:

the respective system of the vehicle controlled by the domain controller comprises one of a powertrain system, an Advance Driver Assistance System (ADAS), a chassis system, or a safety system; and the respective system of the vehicle controlled by the another domain controller comprises a different one of the powertrain system, the ADAS, the chassis system, or the safety system.

8. A computer-implemented method when executed on a processor of a domain controller of a vehicle network causes the processor to perform operations comprising:

receiving a first message from a gateway of the vehicle network via one of a CAN bus or an Ethernet connection, the first message comprising a first portion of an authentication key;

receiving a second message from the gateway via the other one of the CAN bus or the Ethernet connection, the second message comprising a second portion of the authentication key;

determining that the first message comprises the first portion of the authentication key and that the second message comprises the second portion of the authentication key; and based on the first message comprising the first portion of the authentication key and the second message comprising the second portion of the authentication key, decrypting the first message and the second message.

9. The computer-implemented method of claim 8, wherein the first portion of the authentication key and the second portion of the authentication key are combinable into a complete authentication key.

10. The computer-implemented method of claim 8, wherein the CAN bus directly connects at least one electronic control unit to the domain controller and the gateway.

11. The computer-implemented method of claim 8, wherein the CAN bus comprises a CAN-FD.

12. The computer-implemented method of claim 8, wherein:

the operations further comprise transmitting, from the domain controller, via an additional CAN bus, a third message to another domain controller of the vehicle network; and the domain controller and the another domain controller are each configured to control a different respective system of the vehicle.

13. The computer-implemented method of claim 12, wherein the third message when received by the another domain controller causes the another domain controller to control one or more functions of the respective system of the vehicle controlled by the another domain controller.

14. The computer-implemented method of claim 12, wherein:

the respective system of the vehicle controlled by the domain controller comprises one of a powertrain system, an Advance Driver Assistance System (ADAS), a chassis system, or a safety system; and the respective system of the vehicle controlled by the another domain controller comprises a different one of the powertrain system, the ADAS, the chassis system, or the safety system.

* * * * *